(12) United States Patent
Tsai et al.

(10) Patent No.: US 9,335,842 B2
(45) Date of Patent: May 10, 2016

(54) TOUCH PANEL AND DISPLAY APPARATUS

(75) Inventors: Jiun-Jie Tsai, Hsinchu (TW); Tsen-Wei Chang, Taichung (TW); Yu-Tsung Lu, Hsinchu (TW); Hao-Jan Huang, Hsinchu (TW); Ching-Chun Lin, New Taipei (TW); Wing-Kai Tang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 302 days.

(21) Appl. No.: 13/488,461

(22) Filed: Jun. 5, 2012

(65) Prior Publication Data
US 2012/0313871 A1    Dec. 13, 2012

(30) Foreign Application Priority Data

Jun. 7, 2011   (TW) .............................. 100119881 A

(51) Int. Cl.
*G06F 3/041*    (2006.01)

(52) U.S. Cl.
CPC ...................................... *G06F 3/041* (2013.01)

(58) Field of Classification Search
CPC ...... G06F 3/041; G06F 3/044; G02F 1/13338
USPC ................................................ 345/173–179
See application file for complete search history.

(56) References Cited

U.S. PATENT DOCUMENTS

| | | | |
|---|---|---|---|
| 2009/0091546 A1* | 4/2009 | Joo ..................... | G02F 1/13338 345/173 |
| 2009/0159344 A1 | 6/2009 | Hotelling et al. | |
| 2009/0262095 A1* | 10/2009 | Kinoshita ............... | G06F 3/044 345/174 |
| 2012/0044193 A1* | 2/2012 | Peng ....................... | G06F 3/044 345/174 |
| 2012/0139848 A1* | 6/2012 | Lee ......................... | G06F 3/044 345/173 |
| 2012/0319964 A1* | 12/2012 | Liu ......................... | G06F 3/044 345/173 |

FOREIGN PATENT DOCUMENTS

| | | | |
|---|---|---|---|
| CN | 101349660 A | * | 1/2009 |
| CN | 101349960 | | 1/2009 |

(Continued)

OTHER PUBLICATIONS

"Office Action of Taiwan Counterpart Application", issued on Dec. 24, 2013, p. 1-p. 8.

(Continued)

*Primary Examiner* — Amare Mengistu
*Assistant Examiner* — Jennifer Zubajlo
(74) *Attorney, Agent, or Firm* — Jianq Chyun IP Office

(57) ABSTRACT

A touch panel and a display apparatus are provided. The touch panel includes a substrate, first sensing lines, second sensing lines, first extending portions, second extending portions, and insulation pads. The first sensing lines are disposed on the substrate in parallel with a first direction. The second sensing lines are disposed on the substrate in parallel with a second direction. The first sensing lines intersect the second sensing lines to define meshes. The first extending portions are connected to the first sensing lines and extended toward the meshes. The second extending portions are connected to the second sensing lines and extended toward the meshes. The first extending portions and the second extending portions are distributed next to each other in the meshes. The insulation pads are disposed at where the first sensing lines intersect the second sensing lines to insulate the first sensing lines from the second sensing lines.

18 Claims, 5 Drawing Sheets

(56) References Cited

FOREIGN PATENT DOCUMENTS

| CN | 101349960 A | * | 1/2009 |
|----|-------------|---|--------|
| CN | 101515095   |   | 8/2009 |
| CN | 201741138   |   | 2/2011 |
| TW | 201005597   |   | 2/2010 |
| TW | 201022784   |   | 6/2010 |

OTHER PUBLICATIONS

"First Office Action of China Counterpart Application", issued on Sep. 28, 2014, p. 1-p. 9.

* cited by examiner

TOUCH PANEL AND DISPLAY APPARATUS

CROSS-REFERENCE TO RELATED APPLICATION

This application claims the priority benefit of Taiwan application serial no. 100119881, filed on Jun. 7, 2011. The entirety of the above-mentioned patent application is hereby incorporated by reference herein and made a part of this specification.

BACKGROUND OF THE INVENTION

1. Field of the Invention

The invention relates to a touch panel and a display apparatus.

2. Description of Related Art

In today's information age, people rely more and more on electronic products. Notebook computers, mobile phones, personal digital assistants (PDA), and digital audio players all have become the most indispensable tools in our daily life. Each of aforementioned electronic products has an input interface for receiving user commands, such that the internal system of the electronic product can automatically execute the commands. Presently, the most commonly used input interfaces include keyboard and mouse.

However, in some cases, it may be very inconvenient for a user to input commands by using such conventional input interface as a keyboard or a mouse. In order to resolve this problem, a touch panel is usually disposed on an electronic apparatus to replace the conventional keyboard or mouse. Presently, a user usually performs click actions on a touch panel through contacting or sensing behaviors between a finger or a stylus and the touch panel. As to capacitive touch panel, the multi-touch characteristic thereof provides a more personalized operation mode. Accordingly, capacitive touch panel has become one of the most potential touch panel products in the market.

However, in a capacitive touch panel, if the two electrodes for constituting the capacitor are respectively disposed on different surfaces of the same substrate, the entire touch panel will be too thick, which does meet today's demand for slim and thin touch panels. In addition, with the increasing demand for high touch control precision on touch panels, how to precisely detect a touch operation within a very small touch area has become one of the major subjects in the industry.

SUMMARY OF THE INVENTION

Accordingly, the invention is directed to a touch panel with reduced thickness and high touch control precision.

The invention is directed to a display apparatus with reduced thickness and high touch control precision.

The invention provides a touch panel including a substrate, a plurality of first sensing lines, a plurality of second sensing lines, a plurality of first extending portions, a plurality of second extending portions, and a plurality of insulation pads. The first sensing lines are disposed on the substrate in parallel with a first direction. The second sensing lines are disposed on the substrate in parallel with a second direction. The first sensing lines intersect the second sensing lines to define a plurality of meshes. The first extending portions are connected to the first sensing lines and extended toward the meshes. The second extending portions are connected to the second sensing lines and extended toward the meshes. The first extending portions and the second extending portions are distributed next to each other in the meshes. The insulation pads are disposed at where the first sensing lines intersect the second sensing lines to insulate the first sensing lines from the second sensing lines.

The invention provides a display apparatus including a cover plate, a display module, a plurality of first sensing lines, a plurality of second sensing lines, a plurality of first extending portions, a plurality of second extending portions, and a plurality of insulation pads. The first sensing lines are disposed between the cover plate and the display module in parallel with a first direction. The second sensing lines are disposed between the cover plate and the display module in parallel with a second direction. The first sensing lines intersect the second sensing lines to define a plurality of meshes. The first extending portions are connected to the first sensing lines and extended toward the meshes. The second extending portions are connected to the second sensing lines and extended toward the meshes. The first extending portions and the second extending portions are distributed next to each other in the meshes. The insulation pads are disposed at where the first sensing lines intersect the second sensing lines to insulate the first sensing lines from the second sensing lines.

According to the two embodiments described above, each of the first extending portions and each of the second extending portions present an L shape.

According to the two embodiments described above, each of the first extending portions has a first rectangular area and a second rectangular area, where the second rectangular area is extended from the center of a long side of the first rectangular area. Each of the second extending portions has a third rectangular area and two fourth rectangular areas, where the fourth rectangular areas are extended from both sides of a long side of the third rectangular area. Each of the second rectangular areas is located between two of the fourth rectangular areas.

According to the two embodiments described above, each of the first extending portions has a first triangular area and two first pectinate areas. Each of the first triangular areas is located between two of the first pectinate areas. Each of the second extending portions has a second triangular area and two second pectinate areas. Each of the second triangular areas has two of the second pectinate areas extended from both sides of the second triangular area. Each of the first pectinate areas is interlaced with one of the second pectinate areas.

According to the two embodiments described above, each of the first extending portions and each of the second extending portions present a spiral shape.

According to the two embodiments described above, the first direction is perpendicular to the second direction.

The invention provides another touch panel including a substrate, a plurality of sensing lines, a plurality of first spiral portions, a plurality of second spiral portions, a plurality of connecting lines, and a plurality of insulation pads. The sensing lines are disposed on the substrate in parallel with a first direction. The first spiral portions are connected to the sensing lines. Each of the second spiral portions is entwined with two of the first spiral portions. The connecting lines are disposed on the substrate in parallel with a second direction. Two ends of each of the connecting lines are respectively connected to one of the second spiral portions. The connecting lines intersect the sensing lines. The insulation pads are disposed at where the connecting lines intersect the sensing lines to insulate the connecting lines from the sensing lines.

The invention provides another display apparatus including a cover plate, a display module, a plurality of sensing lines, a plurality of first spiral portions, a plurality of second spiral portions, a plurality of connecting lines, and a plurality of insulation pads. The sensing lines are disposed between the cover plate and the display module in parallel with a first direction. The first spiral portions are connected to the sensing lines. Each of the second spiral portions is entwined with two of the first spiral portions. The connecting lines are disposed between the cover plate and the display module in parallel with a second direction. Two ends of each of the connecting lines are respectively connected to one of the second spiral portions. The connecting lines intersect the sensing lines. The insulation pads are disposed at where the connecting lines intersect the sensing lines to insulate the connecting lines from the sensing lines.

According to the two embodiments described above, each of the second spiral portions has two spirals opposite to each other.

According to the two embodiments described above, the first direction is perpendicular to the second direction.

As described above, in a touch panel and a display apparatus provided by the invention, two electrodes of a capacitor are disposed on the same surface of a substrate, and adjacent boundaries of the two electrodes are longer within a unit area. Thus, the thicknesses of the touch panel and the display apparatus are reduced, and the touch control precision thereof is improved.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
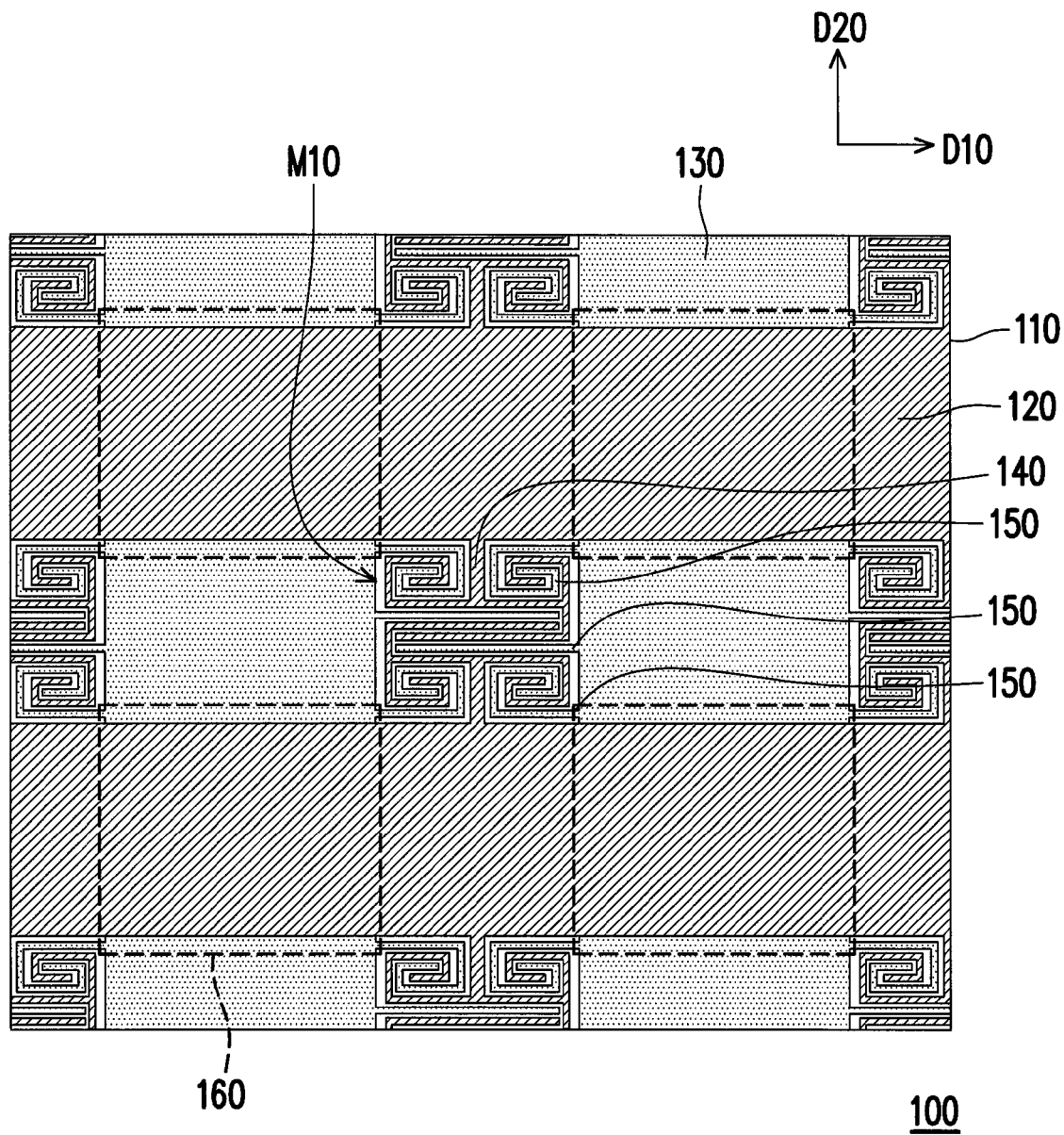
FIG. 1 is a partial view of a touch panel according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a partial view of a touch panel according to an embodiment of the invention. Referring to FIG. 1, the touch panel 100 in the present embodiment includes a substrate 110, a plurality of first sensing lines 120, a plurality of second sensing lines 130, a plurality of first extending portions 140, a plurality of second extending portions 150, and a plurality of insulation pads 160. The first sensing lines 120 are disposed on the substrate 110 in parallel with a first direction D10. The second sensing lines 130 are disposed on the substrate 110 in parallel with a second direction D20. The first sensing lines 120 intersect the second sensing lines 130 to define a plurality of meshes M10. To be specific, each mesh M10 is an area enclosed by two first sensing lines 120 and two second sensing lines 130. The meshes M10 are usually quadrangles. However, the shape of the meshes M10 is not limited herein.

The first extending portions 140 are connected to the first sensing lines 120 and extended toward the meshes M10. The second extending portions 150 are connected to the second sensing lines and extended toward the meshes M10. The first extending portions 140 and the second extending portions 150 are distributed next to each other in the meshes M10. Namely, the meshes M10 are filled up by the first extending portions 140 and the second extending portions 150. Besides, because the first extending portions 140 and the second extending portions 150 are distributed next to each other in the meshes M10, adjacent boundaries of the first extending portions 140 and the second extending portions 150 are longer than a single side of the meshes M10.

The insulation pads 160 are disposed at where the first sensing lines 120 intersect the second sensing lines 130 to insulate the first sensing lines 120 from the second sensing lines 140. To be specific, at where the first sensing lines 120 overlap the second sensing lines 130, the insulation pads 160 are sandwiched between the first sensing lines 120 and the second sensing lines 130 to prevent the first sensing lines 120 and the second sensing lines 130 from contacting each other.

In the touch panel 100 provided by the present embodiment, the first sensing lines 120 and the first extending portions 140 have the same potential, the second sensing lines 130 and the second extending portions 150 have the same potential, and the two sets of sensing lines (i.e., the first sensing lines 120 and the second sensing lines 130) and the extending structures thereof constitute mutual-inductive capacitors. When a user's finger gets close to or contacts the touch panel 100, capacitance within the touch area is changed. Accordingly, by detecting the position where the capacitance changes, the position of the touch area can be determined and accordingly the touch control purpose can be achieved. In particular, because the first extending portions 140 and the second extending portions 150 are distributed next to each other in the meshes M10, the capacitance variation produced by a touch operation is greater than that produced in a conventional touch panel. Accordingly, the touch control precision of the touch panel 100 in the present embodiment is improved. Additionally, because the first sensing lines 120, the second sensing lines 130, the first extending portions 140, the second extending portions 150, and the insulation pads 160 are all disposed on the same surface of the substrate 110, the thickness of the touch panel 100 can be effectively reduced by fabricating the substrate with an appropriate material (for example, glass, PET, cover glass, LCM top glass, or some other suitable materials).

Figure 2:
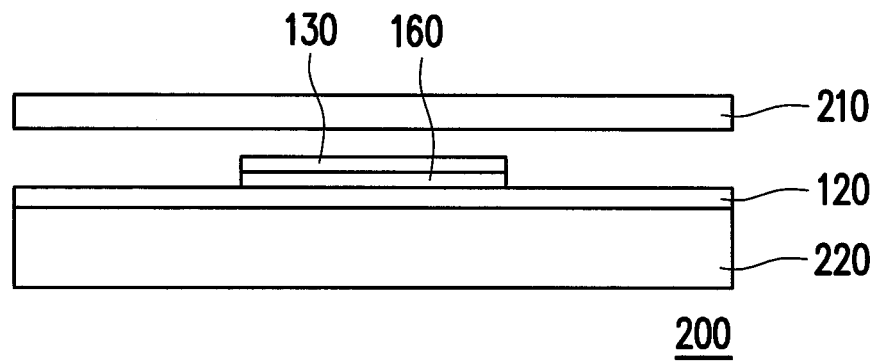
FIG. 2 is a partial cross-sectional view of a display apparatus according to an embodiment of the invention.

FIG. 2 is a partial cross-sectional view of a display apparatus according to an embodiment of the invention. Referring to FIG. 2, the display apparatus 200 in the present embodiment adopts the same concept as the touch panel 100 illustrated in FIG. 1. To be specific, the display apparatus 200 in the present embodiment includes a cover plate 210, a display module 220, and the first sensing lines 120, the second sensing lines 130, the first extending portions 140, the second extending portions 150, and the insulation pads 160 same as those illustrated in FIG. 1 (some components are not shown in FIG. 2). The first sensing lines 120, the second sensing lines 130, the first extending portions 140, the second extending portions 150, and the insulation pads 160 (same as those illustrated in FIG. 1) are disposed between the cover plate 210 and the display module 220, and related description can be referred to the embodiment illustrated in FIG. 1. The display module 220 in the present embodiment is comparable to the substrate 110 in FIG. 1. Namely, the first sensing lines 120, the second sensing lines 130, the first extending portions 140, the second extending portions 150, and the insulation pads 160 are disposed on the display module 220 and then covered by the cover plate 210. The display apparatus 200 in the present embodiment also offers improved touch control precision and reduced thickness.

Figure 3:
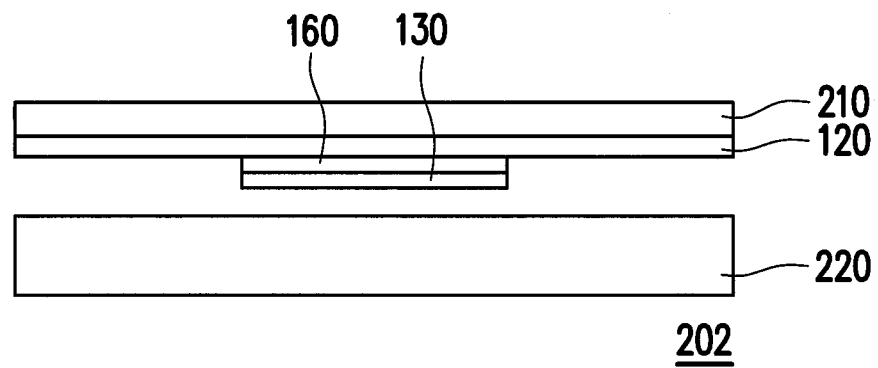
FIG. 3 is a partial cross-sectional view of a display apparatus according to another embodiment of the invention.

FIG. 3 is a partial cross-sectional view of a display apparatus according to another embodiment of the invention. Referring to FIG. 3, the display apparatus 202 in the present embodiment is similar to the display apparatus 200 illustrated in FIG. 2, and the difference between the two is that in the display apparatus 202, the first sensing lines 120, the second sensing lines 130, the first extending portions 140, the second extending portions 150, and the insulation pads 160 are first disposed on the cover plate 210 and then assembled all together onto the display module 220. The display apparatus 202 in the present embodiment also offers improved touch control precision and reduced thickness.

Referring to FIG. 1 again, the pattern formed by the first extending portions 140 and the second extending portions 150 in each mesh M10 is in point symmetry (i.e., the pattern remains the same after it is rotated for 180°). In addition, in the present embodiment, the first direction D10 is perpendicular to the second direction D20 (i.e., the first sensing lines 120 are perpendicular to the second sensing lines 130). However, the first direction D10 and the second direction D20 may also form other angles. In the present embodiment, the first extending portions 140 and the second extending portions 150 respectively present a spiral shape and are entwined with each other. However, some of the second extending portions 150 in the present embodiment respectively present a bar shape.

Figure 4:
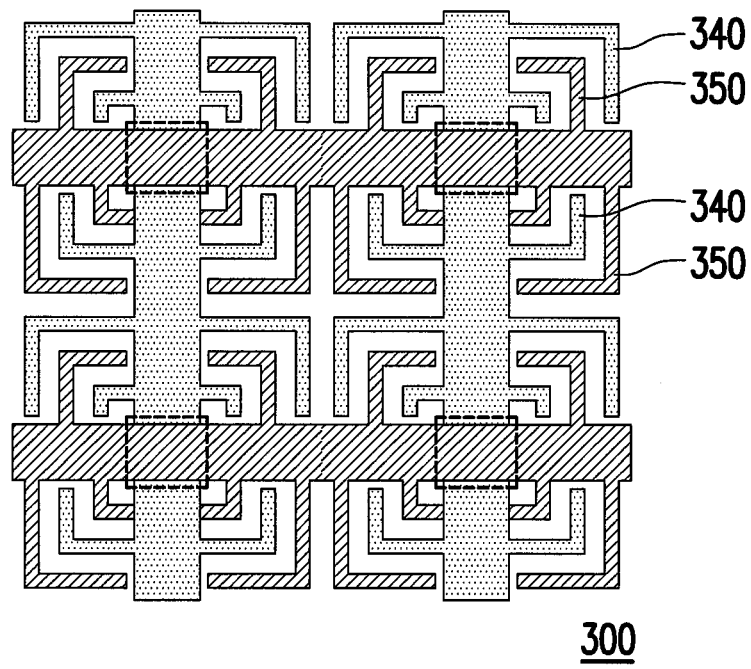
FIG. 4 is a partial view of a touch panel according to another embodiment of the invention.

FIG. 4 is a partial view of a touch panel according to another embodiment of the invention. Referring to FIG. 4, the touch panel 300 in the present embodiment is similar to the touch panel 100 illustrated in FIG. 1, and the difference between the two falls on the pattern of the first extending portions 340 and the second extending portions 350. Other components will not be described herein. In the present embodiment, the first extending portions 340 and the second extending portions 350 respectively present an L shape. In addition, in the present embodiment, the pattern formed by the first extending portions 340 and the second extending portions 350 is in line symmetry.

Figure 5:
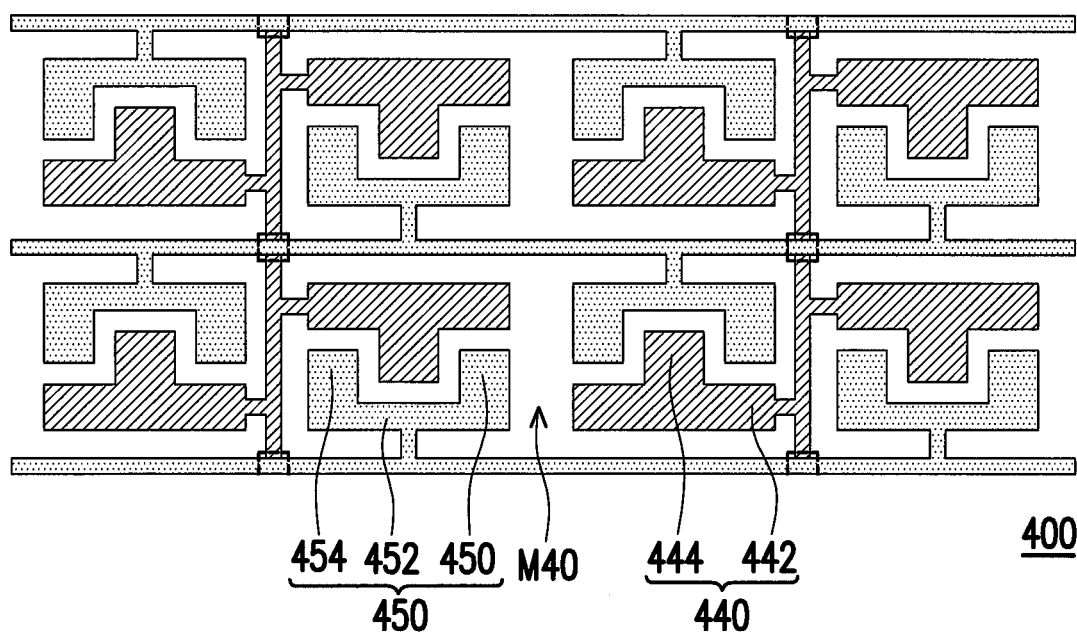
FIG. 5 is a partial view of a touch panel according to another embodiment of the invention.

FIG. 5 is a partial view of a touch panel according to another embodiment of the invention. Referring to FIG. 5, the touch panel 400 in the present embodiment is similar to the touch panel 100 illustrated in FIG. 1, and the difference between the two falls on the pattern of the first extending portions 440 and the second extending portions 450. Other components will not be described herein. In the present embodiment, each first extending portion 440 has a first rectangular area 442 and a second rectangular area 444, where the second rectangular area 444 is extended from the center of a long side of the first rectangular area 442. Each second extending portion 450 has a third rectangular area 452 and two fourth rectangular areas 454, where the two fourth rectangular areas 454 are extended from both sides of a long side of the third rectangular area 452. Each second rectangular area 444 is located between corresponding two fourth rectangular areas 454. Namely, each second rectangular area 444 is enclosed by the corresponding first rectangular area 442, third rectangular area 452, and two fourth rectangular areas 454. The corresponding first extending portion 440 and second extending portion 450 form a rectangle. There are two first extending portions 440 and two second extending portions 450 in each mesh M40. Additionally, in the present embodiment, the pattern formed by the first extending portions 440 and the second extending portions 450 is in point symmetry.

Figure 6:
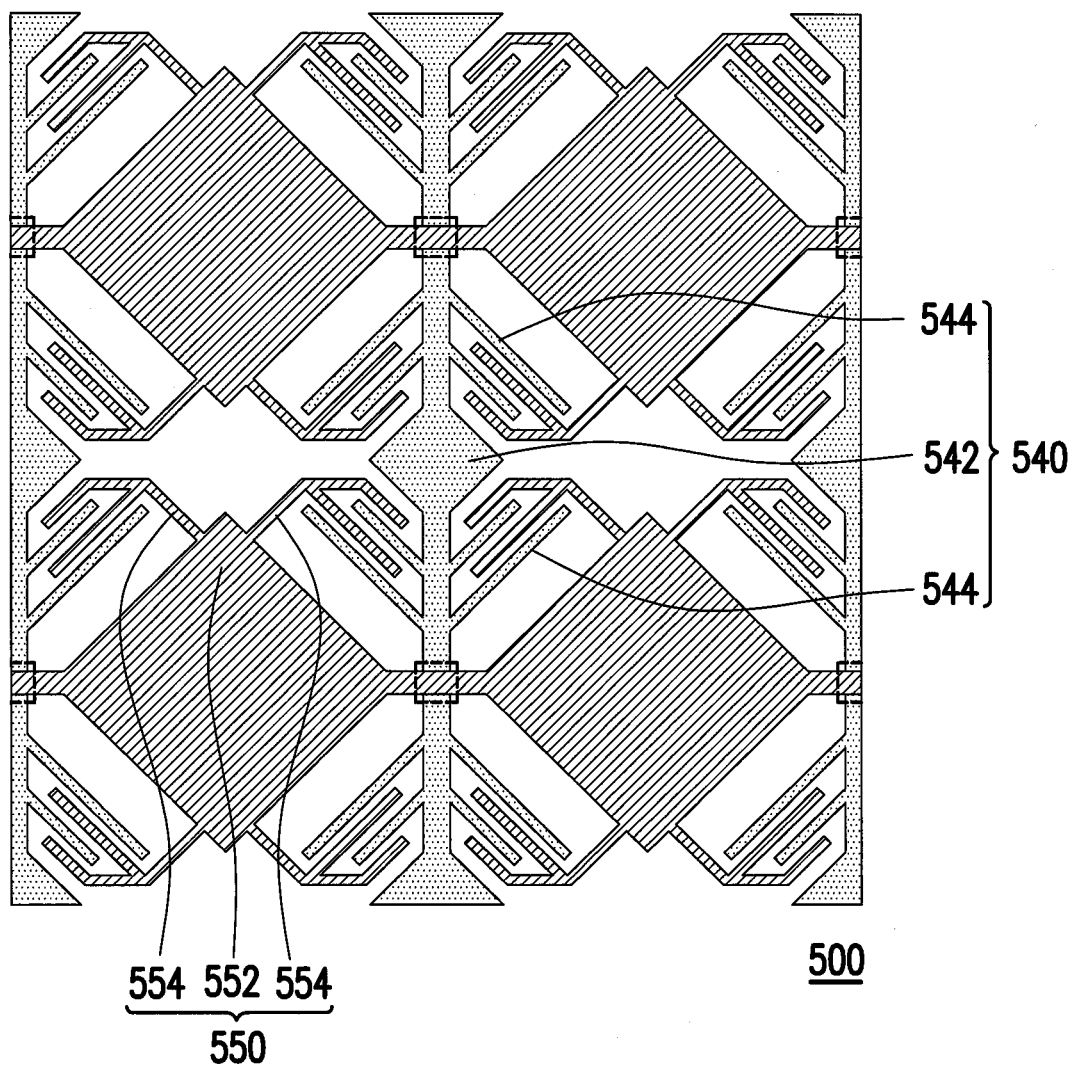
FIG. 6 is a partial view of a touch panel according to another embodiment of the invention.

FIG. 6 is a partial view of a touch panel according to another embodiment of the invention. Referring to FIG. 6, the touch panel 500 in the present embodiment is similar to the touch panel 100 illustrated in FIG. 1, and the difference between the two falls on the pattern of the first extending portions 540 and the second extending portions 550. Other components will not be described herein. In the present embodiment, each first extending portion 540 has a first triangular area 542 and two first pectinate areas 544, where the first triangular area 542 is located between the two first pectinate areas 544. Each second extending portion 550 has a second triangular area 552 and two second pectinate areas 554, where the two second pectinate areas 554 are extended from both sides of the second triangular area 552. Each of the first pectinate areas 544 is interlaced with a corresponding second pectinate area 554. Additionally, in the present embodiment, the pattern formed by the first extending portions 540 and the second extending portions 550 is in point symmetry.

The patterns formed by the first extending portions and the second extending portions in the embodiments illustrated in FIG. 4-FIG. 6 may also be applied to display apparatuses in other embodiments of the invention.

Figure 7:
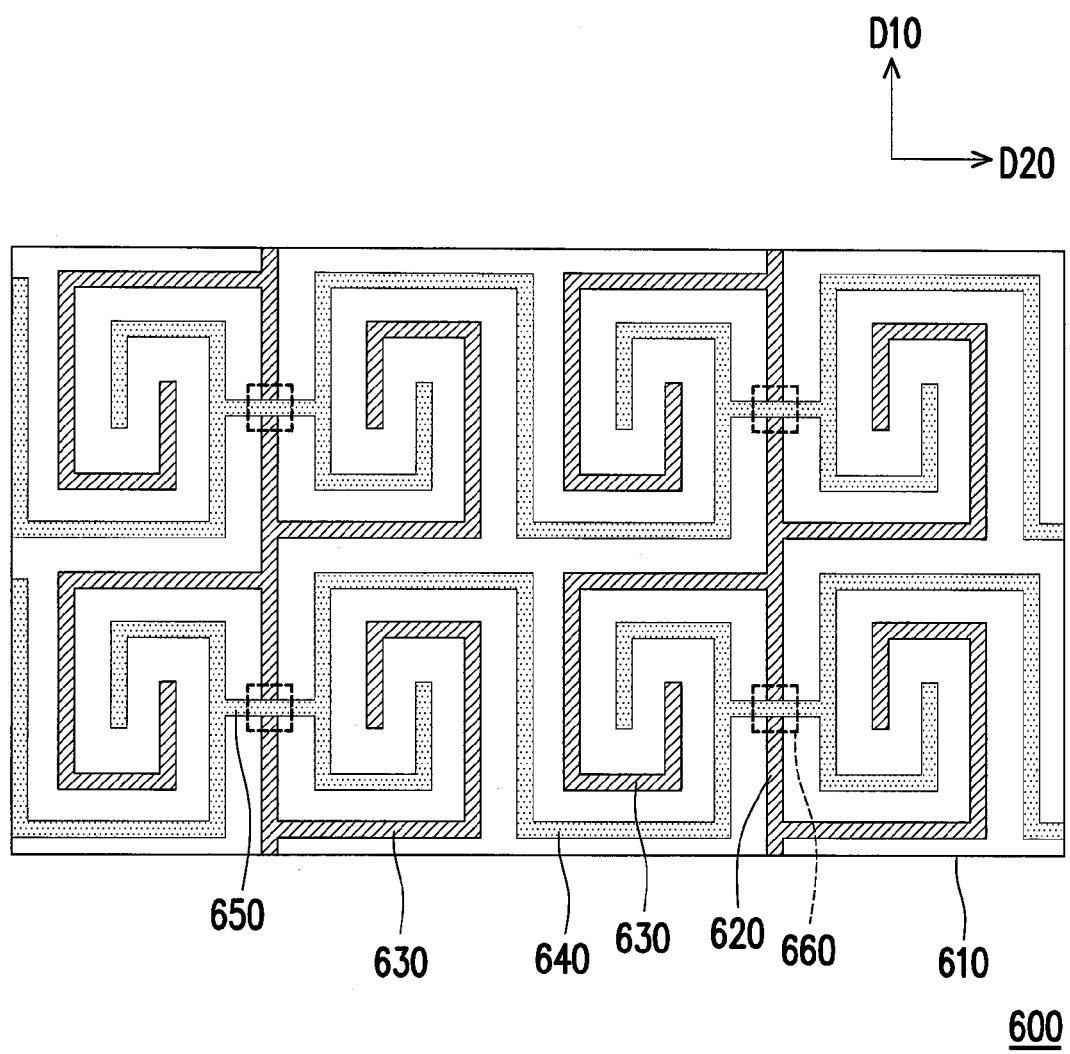
FIG. 7 is a partial view of a touch panel according to another embodiment of the invention.

FIG. 7 is a partial view of a touch panel according to another embodiment of the invention. Referring to FIG. 7, the touch panel 600 in the present embodiment includes a substrate 610, a plurality of sensing lines 620, a plurality of first spiral portions 630, a plurality of second spiral portions 640, a plurality of connecting lines 650, and a plurality of insulation pads 660. The sensing lines 620 are disposed on the substrate 610 in parallel with a first direction D10. The first spiral portions 630 are connected to the sensing lines 620. Each second spiral portion 640 is entwined with corresponding two first spiral portions 630. The connecting lines 650 are disposed on the substrate 610 in parallel with a second direction D20. Two ends of each connecting line 650 are respectively connected to a corresponding second spiral portion 640. The connecting lines 650 intersect the sensing lines 620. The insulation pads 660 are disposed at where the connecting lines 650 intersect the sensing lines 620 to insulate the connecting lines 650 from the sensing lines 620. To be specific, at where the connecting lines 650 overlap the sensing lines 620, the insulation pads 660 are sandwiched between the connecting lines 650 and the sensing lines 620 to prevent the connecting lines 650 and the sensing lines 620 from contacting each other.

Similar to that in the touch panel 100 illustrated in FIG. 1, because the second spiral portions 640 and the corresponding first spiral portions 630 are entwined with each other, the capacitance variation produced by a touch operation in the touch panel 600 of the present embodiment is greater than that produced in a conventional touch panel, so that the touch control precision of the touch panel 600 is improved. In addition, because the sensing lines 620, the first spiral portions 630, the second spiral portions 640, the connecting lines 650, and the insulation pads 660 are all disposed on the same surface of the substrate 610, the thickness of the touch panel 100 can be effectively reduced by fabricating the substrate with an appropriate material (for example, glass, PET, cover glass, LCM top glass, or some other suitable materials).

In the present embodiment, each second spiral portion 640 has two spirals opposite to each other. Additionally, in the present embodiment, the pattern formed by the second spiral portions 640 and the corresponding first spiral portions 630 is in point symmetry.

Figure 8:
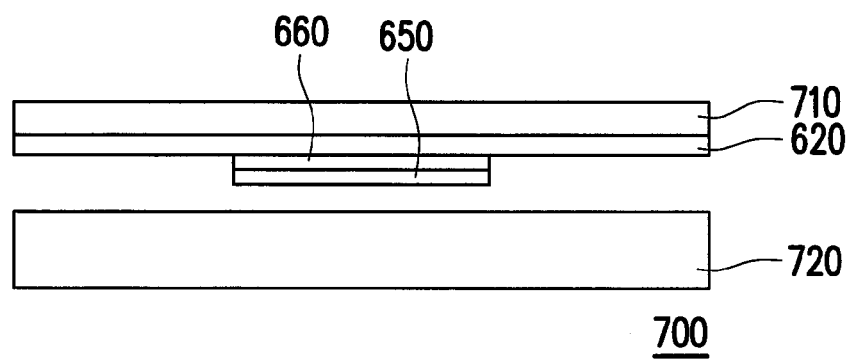
FIG. 8 is a partial cross-sectional view of a display apparatus according to another embodiment of the invention.

FIG. 8 is a partial cross-sectional view of a display apparatus according to another embodiment of the invention. Referring to FIG. 8, the display apparatus 700 in the present embodiment adopts the same concept as the touch panel 600 in FIG. 7. To be specific, the display apparatus 700 in the present embodiment includes a cover plate 710, a display module 720, and the sensing lines 620, the first spiral portions 630, the second spiral portions 640, the connecting lines 650, and the insulation pads 660 same as those illustrated in FIG. 7 (some components are not shown in FIG. 8). The sensing lines 620, the first spiral portions 630, the second spiral portions 640, the connecting lines 650, and the insulation pads 660 (same as those illustrated in FIG. 7) are disposed between the cover plate 710 and the display module 720, and related description can be referred to the embodiment illustrated in FIG. 8. In the present embodiment, the sensing lines 620, the first spiral portions 630, the second spiral portions 640, the connecting lines 650, and the insulation pads 660 are disposed on the cover plate 710 and then assembled all together onto the display module 720. The display apparatus 700 in the present embodiment also offers improved touch control precision and reduced thickness. In another embodiment that is not illustrated, the sensing lines 620, the first spiral portions 630, the second spiral portions 640, the connecting lines 650, and the insulation pads 660 are first disposed on the display module 720 and then covered by the cover plate 710.

In summary, in a touch panel and a display apparatus provided by the invention, two electrodes of a capacitor are disposed on the same surface of a substrate so that the thickness of the touch panel can be reduced, which meets today's demand for slim and thin touch panels. Besides, the single-sized fabrication process is simple and low-cost. In addition, because adjacent boundaries of the two electrodes are longer within a unit area, the capacitance variation produced by a touch operation is increased. Accordingly, the touch control precision is improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch panel, comprising:
    a substrate;
    a plurality of first sensing lines, disposed on the substrate in parallel with a first direction;
    a plurality of second sensing lines, disposed on the substrate in parallel with a second direction, wherein the first sensing lines intersect the second sensing lines to define a plurality of meshes; and
    a plurality of insulation pads, disposed only at where the first sensing lines intersect the second sensing lines to insulate the first sensing lines from the second sensing lines,
    wherein a plurality of first extending portions are extended from the first sensing lines towards the meshes, and a plurality of second extending portion are extended from the second sensing lines towards the meshes, wherein the first extending portions and the second extending portions are distributed next to each other in the meshes.

2. The touch panel according to claim 1, wherein each of the first extending portions and each of the second extending portions present an L shape.

3. The touch panel according to claim 1, wherein each of the first extending portions has a first rectangular area and a second rectangular area, the second rectangular area is extended from a center of a long side of the first rectangular area, each of the second extending portions has a third rectangular area and two fourth rectangular areas, the fourth rectangular areas are extended from both sides of a long side of the third rectangular area, and each of the second rectangular areas is located between two of the fourth rectangular areas.

4. The touch panel according to claim 1, wherein each of the first extending portions has a first triangular area and two first pectinate areas, each of the first triangular areas is located between two of the first pectinate areas, each of the second extending portions has a second triangular area and two second pectinate areas, each of the second triangular areas has two of the second pectinate areas extended from both sides of the second triangular area, and each of the first pectinate areas is interlaced with one of the second pectinate areas.

5. The touch panel according to claim 1, wherein each of the first extending portions and each of the second extending portions present a spiral shape.

6. The touch panel according to claim 1, wherein the first direction is perpendicular to the second direction.

7. A touch panel, comprising:
    a substrate;
    a plurality of sensing lines, disposed on the substrate in parallel with a first direction;
    a plurality of first spiral portions, extending from the sensing lines;
    a plurality of connecting lines, disposed on the substrate in parallel with a second direction, wherein every two adjacent connecting lines extend to form a second spiral portion therebetween, each of the second spiral portions is entwined with two of the first spiral portions, and the connecting lines intersect the sensing lines; and
    a plurality of insulation pads, disposed only at where the connecting lines intersect the sensing lines to insulate the connecting lines from the sensing lines.

8. The touch panel according to claim 7, wherein each of the second spiral portions has two spirals opposite to each other.

9. The touch panel according to claim 7, wherein the first direction is perpendicular to the second direction.

10. A display apparatus, comprising:
    a cover plate;
    a display module;
    a plurality of first sensing lines, disposed between the cover plate and the display module in parallel with a first direction;
    a plurality of second sensing lines, disposed between the cover plate and the display module in parallel with a second direction, wherein the first sensing lines intersect the second sensing lines to define a plurality of meshes; and
    a plurality of insulation pads, disposed only at where the first sensing lines intersect the second sensing lines to insulate the first sensing lines from the second sensing lines, wherein a plurality of first extending portions are extended from the first sensing lines towards the meshes, and a plurality of second extending portion are extended from the second sensing lines towards the meshes, wherein the first extending portions and the second extending portions are distributed next to each other in the meshes.

11. The display apparatus according to claim 10, wherein each of the first extending portions and each of the second extending portions present an L shape.

12. The display apparatus according to claim 10, wherein each of the first extending portions has a first rectangular area and a second rectangular area, the second rectangular area is extended from a center of a long side of the first rectangular area, each of the second extending portions has a third rectangular area and two fourth rectangular areas, the fourth rectangular areas are extended from both sides of a long side of the third rectangular area, and each of the second rectangular areas is located between two of the fourth rectangular areas.

13. The display apparatus according to claim 10, wherein each of the first extending portions has a first triangular area and two first pectinate areas, each of the first triangular areas is located between two of the first pectinate areas, each of the second extending portions has a second triangular area and two second pectinate areas, each of the second triangular areas has two of the second pectinate areas extended from both sides of the second triangular area, and each of the first pectinate areas is interlaced with one of the second pectinate areas.

14. The display apparatus according to claim 10, wherein each of the first extending portions and each of the second extending portions present a spiral shape.

15. The display apparatus according to claim 10, wherein the first direction is perpendicular to the second direction.

16. A display apparatus, comprising:
a cover plate;
a display module;
a plurality of sensing lines, disposed between the cover plate and the display module in parallel with a first direction;
a plurality of first spiral portions, extending from the sensing lines;
a plurality of connecting lines, disposed between the cover plate and the display module in parallel with a second direction, wherein every two adjacent connecting lines extend to form a second spiral portion therebetween, each of the second spiral portions is entwined with two of the first spiral portions, and the connecting lines intersect the sensing lines; and
a plurality of insulation pads, disposed only at where the connecting lines intersect the sensing lines to insulate the connecting lines from the sensing lines.

17. The display apparatus according to claim 16, wherein each of the second spiral portions has two spirals opposite to each other.

18. The display apparatus according to claim 16, wherein the first direction is perpendicular to the second direction.

* * * * *